United States Patent
Hatayama (10) Patent No.: US 6,278,985 B1
(45) Date of Patent: Aug. 21, 2001

(54) VIRTUAL ELEMENT SELECTION DEVICE AND METHOD USING A NEURAL NETWORK

(75) Inventor: Akemi Hatayama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/193,724

(22) Filed: Nov. 17, 1998

(30) Foreign Application Priority Data

Nov. 17, 1997 (JP) .................................................. 9-314773

(51) Int. Cl.⁷ .................................................. G06F 17/00
(52) U.S. Cl. .................................................. 706/20
(58) Field of Search ................................ 706/20, 12, 30

(56) References Cited

U.S. PATENT DOCUMENTS

| | | | |
|---|---|---|---|
| 5,491,777 | 2/1996 | Mase et al. | 395/133 |
| 5,498,003 | * 3/1996 | Gechter | 463/31 |
| 5,566,295 | * 10/1996 | Cypher et al. | 345/326 |
| 5,710,894 | * 1/1998 | Maulsby et al. | 345/326 |
| 5,880,788 | * 3/1999 | Bregler | 348/515 |

FOREIGN PATENT DOCUMENTS

| | | |
|---|---|---|
| 8-47579 | 2/1996 | (JP) . |
| 8257233 | 10/1996 | (JP) . |
| 8329267 | 12/1996 | (JP) . |
| 9-140938 | 6/1997 | (JP) . |

OTHER PUBLICATIONS

S. Grand et al., "Creatures: Artificial Life Autonomous Software Agents for Home Entertainment," Proceedings of the First International Conference on Autonomous Agents, Feb. 5–8, 1997, pp. 22–29.*

P. Maes, "Artificial Life meets Entertainment: Interacting with Lifelike Autonomous Agents," Special Issue on New Horizons of Commercial and Industrial AI, Communications of the ACM, ACM Press, vol. 38, No. 11, pp. 108–114, Nov. 1995.*

M. Slater et al., "Taking Steps: The Influence of a Walking Technique on Presence in Virtual Reality," ACM Transactions on Computer–Human Interaction, vol. 2, No. 3, pp. 201–219, Sep. 1995.*

D. Coco, "Creating Intelligent Creatures (Artificial Intelligence in Computer Games)," Computer Graphics World, vol. 20, No. 7, pp. 22–26, Jul. 1997.*

"World's First Commercial Artificial Life Product Hatches on Home Computers; Mindscape to Publish 'Creatures' in North Americal," PR Newswire, May 1, 1997, p. 501LATH035.*

"Inscape's Creatures Hatch on Computers this Fall Millennium Interactive's Advanced Artificial Life Technology Opens Uncharted Realm on the PC," Business Wire, Jun. 24, 1996, p. 6241168.*

M. Rettig, "Virtual Reality and Artificial Life," AI Expert, vol. 8, No. 8, pp. 15–17, Aug. 1993.*

SimLife [online]. Nov. 24, 19999 [retrieved on Aug. 10, 2000], Retrieved from the Internet <http://www.meli.dist-.maricopa.edu/proj/sw/games/simlife.html>.*

SimLife CD–ROM Classic [online]. [retrieved on Aug. 1, 2000], Retrieved from the Internet <http://www.maxis.com/games/simlife.*

* cited by examiner

*Primary Examiner*—Mark Powell
(74) *Attorney, Agent, or Firm*—Foley & Lardner (57) ABSTRACT

In a virtual element selection device for use in growing, in an electronic device, virtual life composed of various parts or elements, an indication is given from a user and is converted by a neural network into a new element of the virtual life. The new element is substituted for an old one to be displayed on a display device. Using the neural network makes it possible to select the new element which reflects the user's intention.

8 Claims, 6 Drawing Sheets

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 1 | 1 | 1 | 1 | 0 | 0 | 0 |
| 0 | 0 | 1 | 1 | 0 | 0 | 1 | 1 | 0 | 0 |
| 0 | 0 | 1 | 0 | 0 | 0 | 0 | 1 | 1 | 0 |
| 0 | 0 | 1 | 1 | 0 | 0 | 0 | 1 | 1 | 0 |
| 0 | 0 | 0 | 1 | 1 | 0 | 1 | 1 | 0 | 0 |
| 0 | 0 | 0 | 0 | 1 | 1 | 1 | 0 | 0 | 0 |
| 0 | 0 | 0 | 0 | 0 | 1 | 0 | 0 | 0 | 0 |

| HEAD | 0 | 1 | 2 | 3 | 4 | 5 | 6 | 7 | 8 | 9 | BODY |
|---|---|---|---|---|---|---|---|---|---|---|---|
| 0 | J | J | J | J | G | G | J | J | J | J | |
| 1 | I | J | J | F | G | G | F | J | J | I | |
| 2 | I | H | F | E | D | D | E | F | H | I | |
| 3 | I | H | E | C | A | A | C | E | H | I | |
| 4 | I | H | D | B | S | S | B | D | H | I | |
| 5 | I | H | D | B | S | S | B | D | H | I | |
| 6 | I | H | E | C | A | A | C | E | H | I | |
| 7 | I | H | F | E | D | D | E | F | H | I | |
| 8 | I | J | J | F | G | G | F | J | J | I | |
| 9 | J | J | J | J | G | G | J | J | J | J | |
| HANDS | | | | | | | | | | | LEGS |

FIG. 10

VIRTUAL ELEMENT SELECTION DEVICE AND METHOD USING A NEURAL NETWORK

BACKGROUND OF THE INVENTION

The present invention relates to an electronic device for use in electronically growing virtual life in accordance with a program and, in particular, a virtual element selection device and method for selecting a virtual element, such as a part, a constituent, an item, and the like, to grow the virtual life in the electronic device.

Recently, electronic devices, such as personal computers, video game devices, have widely and quickly prevailed in the world. With prevalence of such electronic devices. In addition, users or customers tend to have a taste for more interesting video games and more complicated video games. This brings about a difficulty or complexion of handling or manipulating the electronic devices.

Among new types of such video games, a growing or raising simulation game (will be simply called a growing game) has been proposed in which virtual life is grown in the electronic devices. As known in the art, such a growing game includes a game (will be called a first game) of growing or raising virtual life by battling with an enemy like a role playing game, a game (will be called a second game) of raising virtual life by searching a predetermined treasure or key word in the game, or a game (will be called a third game) of enjoying reaction or activity of virtual life by feeding the virtual life like a pet or by giving a stimulus to the virtual life.

In the first and the second games mentioned above, the growth or variation of the virtual life depends on the number and species of battled enemies and kinds of the key words. on the other hand, the growth or variation of the virtual life relies in the third game on a species or a quantity of foods and a kind of stimuli given to the virtual life.

Alternatively, another type of a growing simulation game has been disclosed, for example, in Japanese Unexamined Patent Publication No. Hei 9-140938, namely, 140938/1997. In this growing simulation game, a virtual baseball player can favorably grow into a successful baseball player by conveniently displaying characters or attributes from a menu and by conveniently and successively opting one of the characters or attributes from the menu. In this event, selecting the characters or attributes from the menu reflects user's or customer's personality, namely, intention.

However, user's personality can not completely be reflected on growing the virtual baseball player because options are previously determined on the menu and are only selected by the user. In other words, user's intention partially or discretely influences the growth and variation of the virtual baseball player when one of the options alone is selected by the user from the menu displayed.

Under the circumstances, when the same or a similar option is selected by the user, the same or similar results are obtained. Stated otherwise, when virtual life is given the same or like stimulus, the growth of the virtual life is uniquely determined whoever grows the virtual life.

In order to provide a variety of options, a great amount of menu information should be stored in a memory to be displayed as a menu and gives rise to a problem in economy. In other words, the memory must be large in memory capacity.

Moreover, the conventional approach mentioned above previously determines a relationship between a given option and the corresponding activity or reaction of the virtual life. This makes it difficult to intuitively know about relationships between each option and the corresponding activity or reaction of the virtual life because neither the activity nor the reaction can be tried in connection with the other options unselected by the user. Furthermore, the user can not know about what kind of a tendency or taste the virtual life has in the game. For example, the user can not give or select an instruction, such as a taste for a resembling matter, a taste for a soft configuration rather than a square configuration. As a result, the conventional approach lacks reality.

SUMMARY OF THE INVENTION

It is an object of the present invention to provide a virtual element selection device which is capable of increasing reality in a video game.

It is another object of the present invention to provide a virtual element selection device of the type described, which is capable of widely reflecting a user's intention or personality in the video game.

It is still another object of the present invention to provide a virtual element selection device of the type described, which is capable of giving information inherent to the user to the virtual life.

It is yet another object of the present invention to provide a virtual element selection device of the type described, which is capable of intuitively knowing an influence of an element to the virtual life.

It is another object of the present invention to provide a vide game device which uses the virtual element selection device.

It is another object of the present invention to provide a recording medium which is capable of playing a growing sirwlation game by the use of a neural network.

A virtual element selection device to which is applicable is for use in electronically growing virtual life in an electronic device. According to an aspect of the present invention, the virtual element selection device comprises indication means for providing a visual indication, numerating means for numerating the visual indication into a number data signal, a neural network for classifying the number data signal into a class number which corresponds to the number data signal, a reference table for storing a plurality of elements concerned with growth of the virtual life, an image memory for storing images of the respective elements, and judging means coupled to the neural network, the reference table, and the image memory for judging whether or not the element of the virtual life is modified into a modified element with reference to the class number, and display means for displaying the image of the modified element when the element of the virtual life is modified.

According to another aspect of the present invention, a method is for use in selecting, in an electronic device, an element of virtual life which grows up in the electronic device and comprises the steps of providing a visual indication in the form of visual information, converting the visual information into a numerical data signal corresponding to the visual information by using a neural network classifying the numerical data signal into a class number, judging in response to the class number whether or not the element of the virtual life is to be modified, preparing an element reference table which stores a plurality of elements, having access to the element reference table on judging that the element of the virtual life is changed at the judging step, to extract a modified element from the element reference table, and visually displaying the modified element on a display device.

According to still another aspect of the present invention, a recording medium stores a program which is for use in growing virtual life in an electronic device to change each element of the virtual life. The program defines the steps of providing a visual indication in the form of visual information, converting the visual information by the use of a neural network into a numerical data signal corresponding to the visual information, classifying the numerical data signal into a class number, judging in response to the class number whether or not the element of the virtual life is to be modified, preparing an element reference table which stores a plurality of elements, having access to the element reference table on judging that the element of the virtual life is changed at the judging step, to extract a modified element from the element reference table, and visually displaying the modified element on a display device.

According to yet another aspect of the present invention, a video game device is for use in playing a predetermined game by the use of a display device under manipulation of a user. The video game device comprises a central processing unit for executing a program which defines the predetermined game and a neural network which is operable as an interactive interference between the user and the central processing unit.

DESCRIPTION OF THE PREFERRED EMBODIMENT

Figure 1:
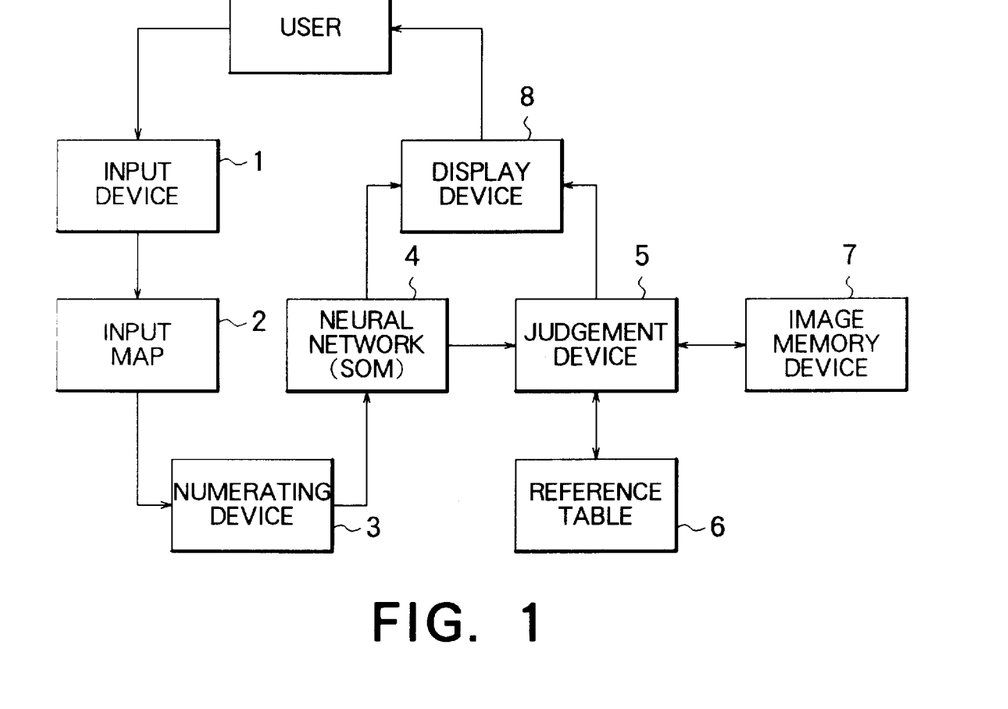
FIG. 1 is a block diagram of an electronic device which is operable as a virtual element selection device according to a preferred embodiment of the present invention.

Referring to FIG. 1, a virtual element selection device according to a preferred embodiment of the present invention is implemented by an electronic device, such as a personal computer, a video game device. In the example being illustrated, it is assumed that a growing game is played or executed in the electronic device to grow virtual life which may be called a virtual robot which is composed of a plurality of elements, such as a head, hands, a body, and legs and that the virtual robot is controlled by a user or player from the birth to the death in the growing game.

In FIG, 1, the illustrated virtual element selection device is structured by an input device 1, an input map 2, a numerating device 3, a neural network 4, a judgement device 5, a reference table 6, an element memory device 7, and a display device 8. In this event, the input device 1 may be, for example, a mouse, a keyboard, a handwriting pen, a joystick, a pad, or the like which is used for drawing a figure by a user. The figure drawn is displayed on the display device 8. The display device 8 may be, for example, a general purpose CRT display device, or the like. Moreover, the judgment device 5 is practically a central processing unit (CPU) which is operable in accordance with a program stored in a recording medium, such as a hard disk, a semiconductor memory, a compact disk, or the like. At any rate, the judgement device 5 executes an operation determined by the program, as become clear as the description proceeds.

Herein, it is to be noted that the neural network 4 serves as a self organization map which can be individually organized or controlled by the user or player in the virtual element selection device. In other words, the neural network 4 may provide an interactive interference between the user and the CPU or the judgement device 5 because the neural network 4 is operable to inform the CPU of the user's intention.

Figure 2:
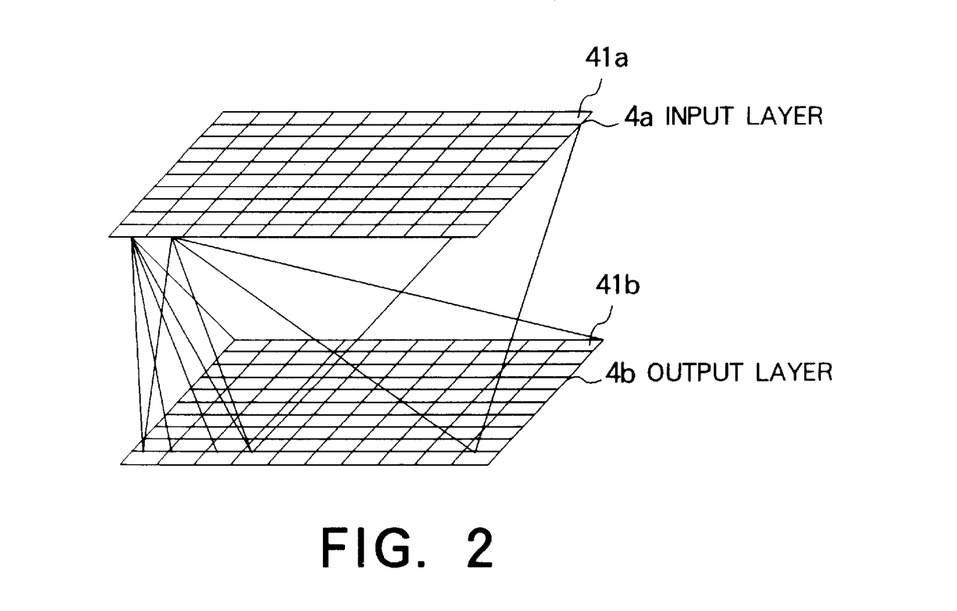
FIG. 2 is a schematic view for use in describing a neural network included in the virtual element selection device.

Referring to FIG. 2 along with FIG. 1, the neural network 4 has an input layer 4a and an output layer 4b each of which is divided into a plurality of units 41 and 42. The illustrated neural network 4 is structured by a recurrent neural network in which each of the units on the input layer 4a is coupled to all the units of the output layer 4b opposite to the input layer 4a. The illustrated neural network 4 is given numerated data signals as an input signal on the units 41a of the input layer 41 and produces an output signal from either one of the units 41b of the output layer 4b that may be referred to as an excited unit or ignition unit. Thus, the output signal is sent through a selected one of the units of the output layer 4b that is changed in response to the numerated data signals.

With the neural network 4, it is possible to classify the numerated data signals into a plurality of classes which are determined by the units 41b on the output layer 4b. Specifically, when the numerated data signals are similar to or identical with each other, the output signals are produced through near or the same units of the output layer 4b. On the other hand, when the numerated data signals are different from each other, the output signals are produced through the units of the output layer 4b remote or distant from each other.

From this fact, it is readily understood that the viser may give the neural network 4 only a pattern (figure) which the user wants to classify and that the illustrated neural network does not need a learning function. Therefore, a characteristic of the neural network 4 illustrated in FIG. 2 may be called teacherless learning. Such a neural network 4 shown in FIGS. 1 and 2 is known in the art.

Figure 3:
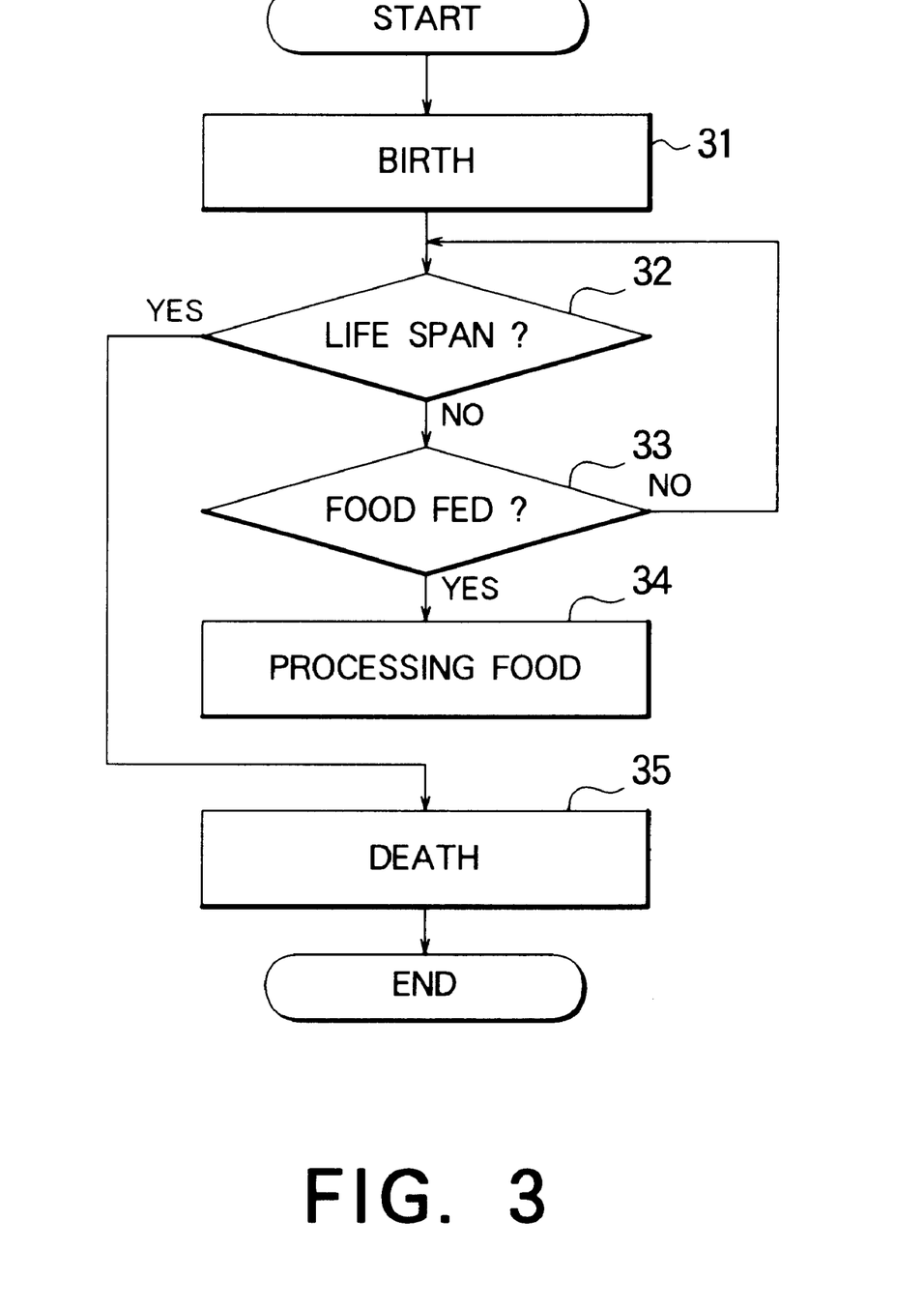
FIG. 3 is a flow chart for use in describing a growing game executed in the virtual element selection device.

Referring to FIG. 3, description will be made about the growing game according to the present invention. When the growing game is started, the virtual robot in question is at first born at a first stage 31 and may be called electronic virtual life also. Practically, the virtual robot is displayed on the display device 8 under control of the judgement device 5. Subsequently, judgement is made at a second stage 32 about whether or not the virtual robot reaches a predetermined life span. in the electronic device illustrated in FIG. 1, the judgement device 5 monitors the life span of the virtual robot and determines whether or not the life time of the virtual robot reaches the predetermined life span.

When the life time of the virtual robot does not reach the predetermined life span, the second stage 32 proceeds to a third stage 33 at which a food is fed to the virtual robot. The third step 33 is practically executed by the user to operate or manipulate the input device 1 in a manner to be described later in detail.

If any food is fed to the virtual robot at the third step 33, the third stage 33 is followed by a fourth stage 34 at which processing is executed in connection with the food in a manner to be mentioned later, Otherwise, the third step 33 is returned back to the second step 32 to check whether or not the life time of the virtual robot reaches the predetermined life span. If the life time of the virtual robot reaches the life span, the second stage 32 jumps to a fifth stage 35 at which the virtual robot dies and the game becomes over.

With this growing game, the user performs only feeding a food to the virtual robot from the birth to the death. Feeding any food, the virtual robot reacts with the food and may vary its elements or parts.

Figure 4:
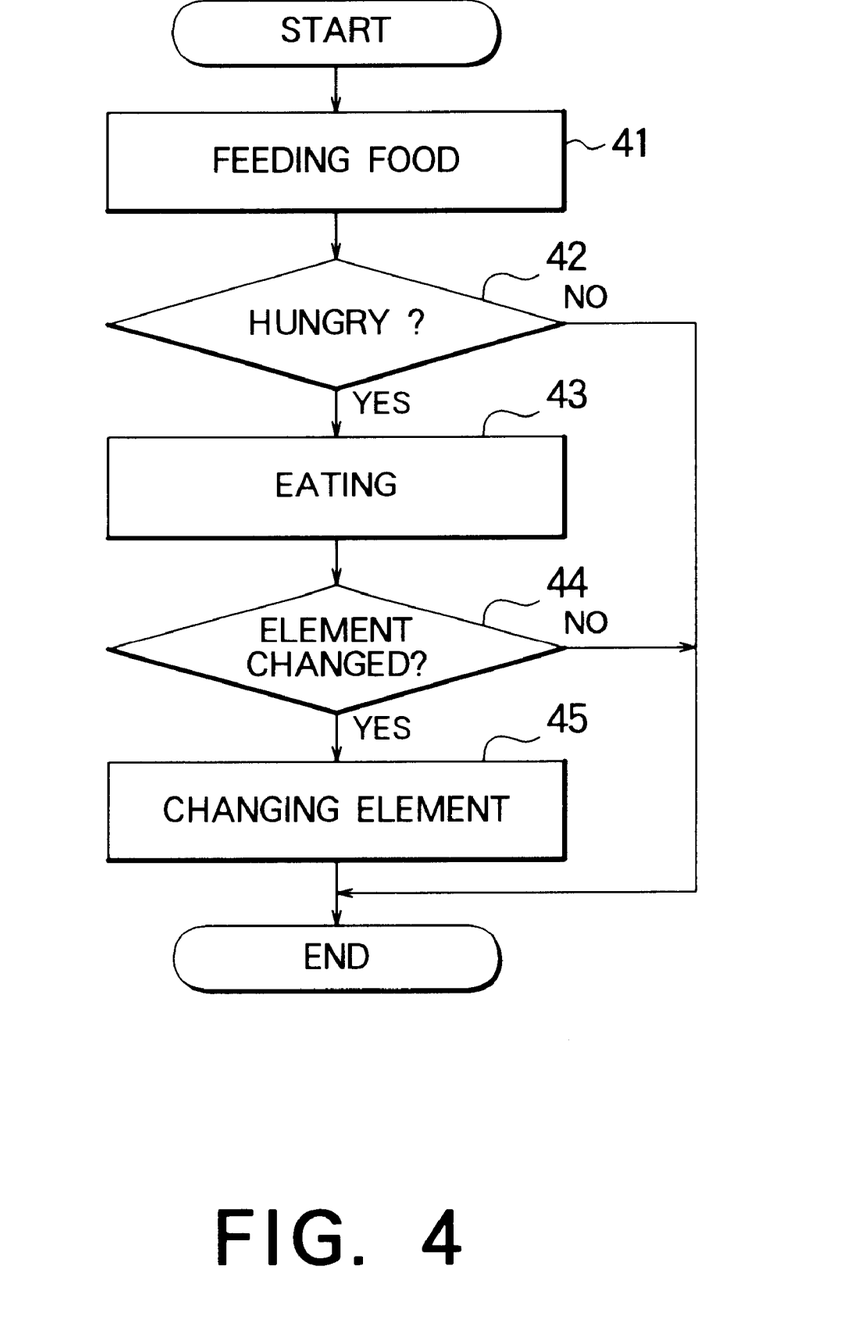
FIG. 4 is a flow chart for use in describing a part of the flow chart illustrated in FIG. 3 more in detail.

Referring to FIG. 4, the fourth stage 34 illustrated in FIG. 3 will be described and is started by seeding a food to the virtual robot and finished by changing an element of the virtual robot. More specifically, any food is fed to the virtual robot at a first step 41. In this example, it is to be noted that such a food is fed to the virtual robot by drawing the food by the use of the input device 1 and by inputting the drawn food to the input map 2.

Figure 5:
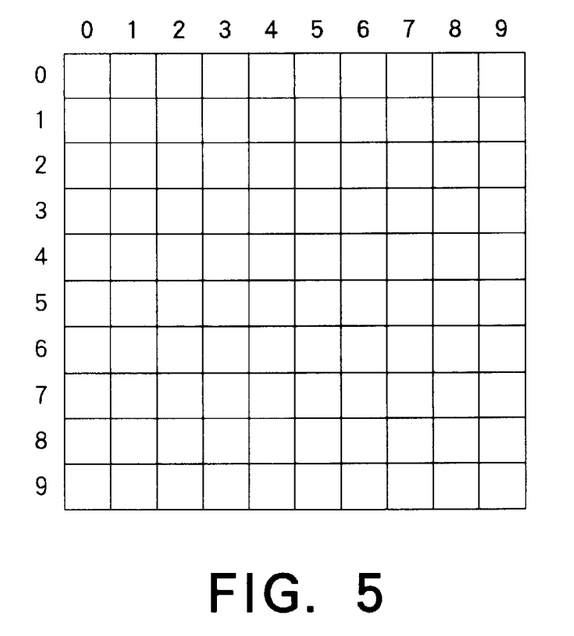
FIG. 5 is a view for use in describing an input map illustrated in FIG. 1.
Figure 6:
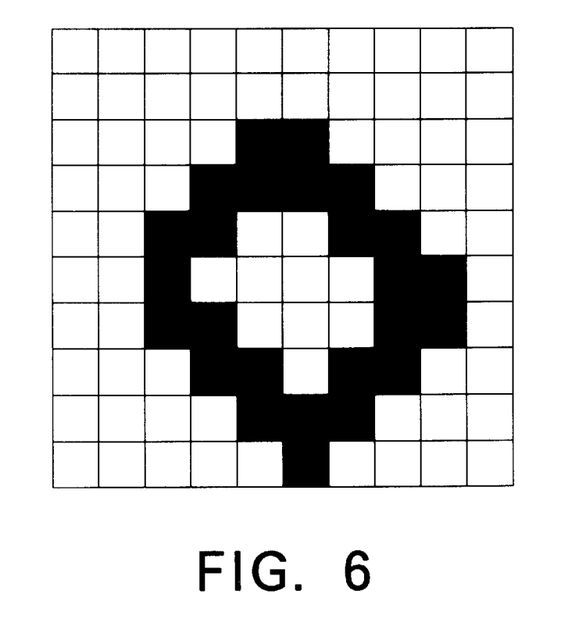
FIG. 6 exemplifies a pattern drawn on the input map shown in FIG. 5.

Temporarily referring to FIG. 5, the input map 2 is structured by a map of cells composed of ten by ten. Such an input map may be displayed on the display device 8. With this structure, each cell can be changed from white to black or from black to white. The user manipulates the input device 1 to invert a color of each cell from white to black or from black to white. As a result, the user can draw a figure or a pattern, as shown in FIG. 6 on the input map 2.

Referring back to FIG. 4, judgement is made at a second step 42 about whether or not the virtual robot is hungry. If the virtual robot is starved, the second step 42 is succeeded by a third step 43 at which the virtual robot eats the food fed by the user. Otherwise, the processing concerned with the food is finished, as readily understood from FIG. 4.

Figure 7:
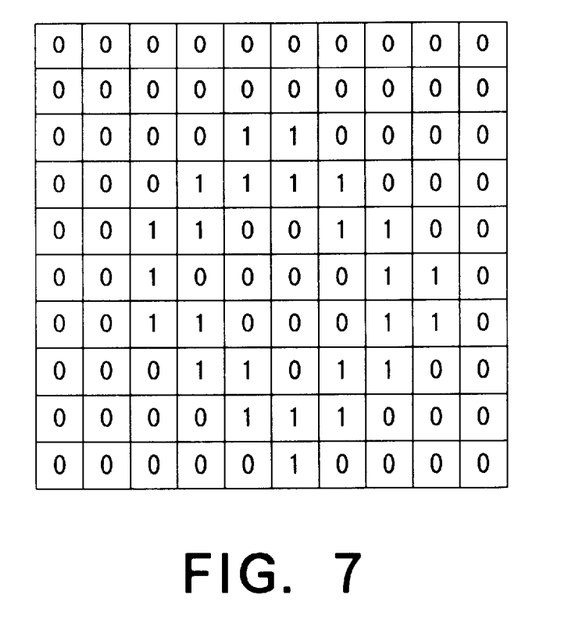
FIG. 7 is a view for use in describing a numerated datazpattern corresponding to the pattern illustrated in FIG. 6.

At the third step 43, the figure or pattern drawn on the input map 2 is given to the numerating device 3 to be converted into a numerated data signal which is representative of numerals and which may be named a numerical pattern. This means that the figure illustrated in FIG. 6 is converted into a numerical pattern as illustrated in FIG. 7. In FIG. 7, white and black of FIG. 6 are converted into the numeral "0" and "1", respectively. The numerated data signal is sent from the numerating device 3 to the neural network 4 mentioned before.

The illustrated neural network 4 is assumed to have the input and the output layers 4a and 4b each of which is composed of one hundred units. The neural network 4 classifies the numerical pattern to select one of the units on the output layer 4b (FIG. 2) and to produce an output signal through the selected unit as an output map which is representative of a result of classification and which is specified by a class number.

Figure 8:
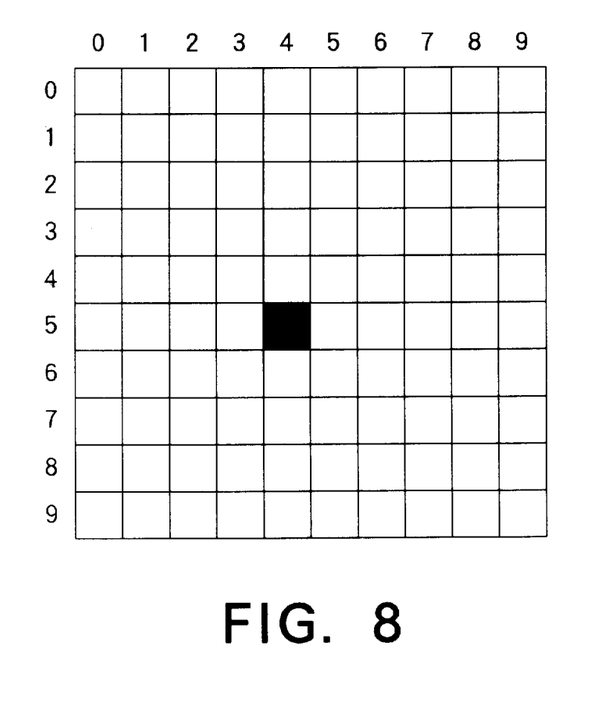
FIG. 8 is a view for use in describing an output map which appears in response to the pattern illustrated in FIG. 6.

Referring to FIG. 8, the output map is exemplified which corresponds to the numerical pattern illustrated in FIG. 6. Specifically, the output map has a cell matrix of ten by ten output cells arranged along horizontal and vertical directions. As shown in FIG. 8, the cells along each of the horizontal and the vertical directions are numbered from 0 to 9. In the example, it is readily understood that a single cell (4, 5) is inverted into black and is therefore selected which corresponds to the numerical pattern illustrated in FIG. 6.

Herein, it is noted that the output cells are made to correspond to the class numbers which define the elements or parts variable in response to the drawn food fed by the user. In addition, the output map shown in FIG. 8 is given from the neural network 4 to the display device 8 on one hand and is supplied to the judgement device 5 on the other hand. The output map which is displayed on the display device 8 is fed back to the user as an image.

Figure 9:
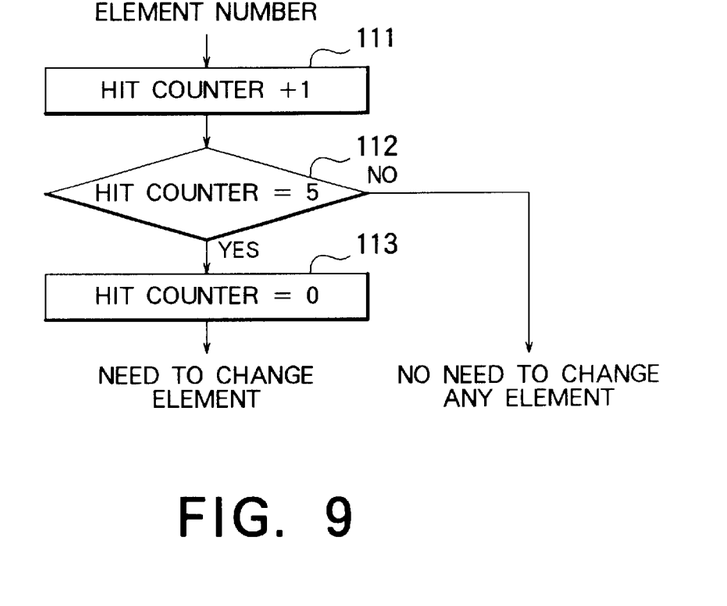
FIG. 9 is a flow chart for use in describing a part of the flow chart illustrated in FIG. 4.

The third step 43 is followed by a fourth step 44 at which the judgement device 5 (FIG. 1) judges whether or not the parts or elements of the virtual robot axe to be partially changed. To this end, the judgement device 5 executes processing as illustrated in FIG. 9. In other words, the fourth step 44 is divided into a plurality of sub-steps which are shown in FIG. 9 and which are executed by the use of a hit counter (not shown) prepared in the judgement device 5 (FIG. 5). it is presumed that a count in the hit counter stands for selection times of each part or element to be changed and becomes equal to zero in an initial state.

In FIG. 9, the fourth step 44 is started by a first one of the sub-step 111 at which the hit counter is counted up by +1 each time when the part to be changed is selected. At a second sub-stop 112, the judgement device 5 judges whether or not the count of the hit counter becomes equal to a predetermined count, namely, 5 in the illustrated example. If the count of the hit counter is equal to 5, the second sub-step 112 is succeeded by a third sub-step 113 at which the hit counter is initialized into zero and the judgement device 5 indicates necessity of changing the element in question.

On the other hand, if the count of the hit counter is less than 5, the judgement device 5 judges the change of the element is unnecessary for the time being.

Referring back to FIG. 4, when the judgement device 5 judges the necessity of changing the element as described in connection with FIG. 9, the fourth step 44 in FIG. 4 is followed by a fifth step 45 to change or modify the element or part in question. Specifically, the judgement device 5 detects the position (for example, (4,5) in FIG. 8) of the selected part or element and has an access to the reference table 6 to extract, from the reference table 6, a part to be changed.

Figure 10:
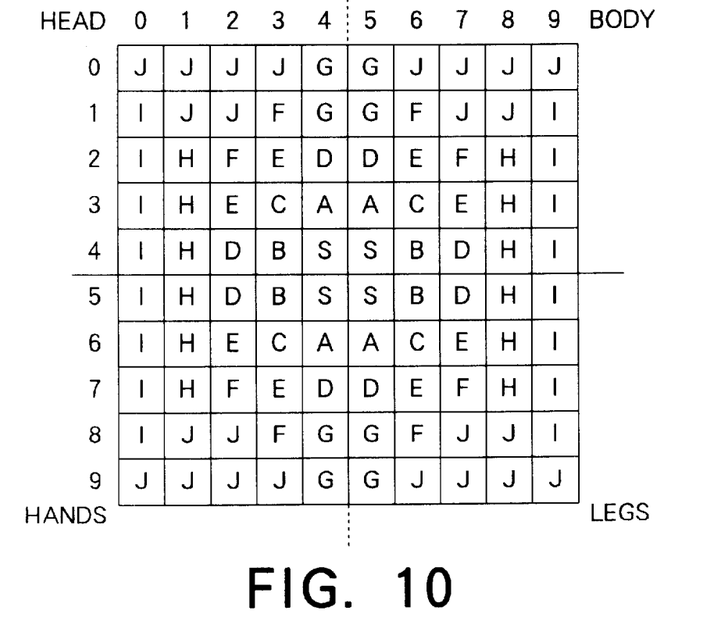
FIG. 10 is a view for use in describing correspondence between a reference table illustrated in FIG. 1 and the output map illustrated in FIG. 8.

Referring to FIG. 10, the reference table 6 stores species (represented by A to S) of the parts or elements in respective cells of the reference table 6. The illustrated reference table 6 is divided into the head, the body, the hands, and the legs and is composed of cells which correspond to the output map mentioned in conjunction with FIG. 8. This shows that the part or element to be changed is located in the reference table 6 at the same position as the output map. In the illustrated example, the part symbolized by S at the position (4, 5) of the reference table 6 (FIG. 10) corresponds to the position (4, 5) of the output map (FIG. 8) and is to be changed. in the illustrated example, the species (A to S) in each of the body, the hands, and the legs define variations and modifications of each part, namely, each of the head, the body, the hands, and the legs.

When the species and the position of the part to be changed is determined in the above-mentioned manner, the judgement device 5 accesses the memory device 7 to read an image which corresponds to the part and displays the image on the display device 8.

As mentioned before, the present invention can accomplish a wide variety of growth patterns in a virtual robot, namely, virtual life by using the neural network which can be individually controlled by each user. with this structure, it is possible to know about each element changed, in consideration of the output signal sent from the neural network. In other words, it is possible to anticipate a relationship between a figure drawn on the input map 1 and a changed or modified part. Accordingly, the present invention is effective in that the relationship between the input and the resulting reaction can be intuitively predicted by the user.

Inasmuch as the present invention can feed, to virtual life, a food for which individuals have a taste, each individual can feel close to the virtual life. Moreover, the present invention can accomplish an increase of input patterns merely by preparing a small size of a neural network and an input map, without using a large capacity of a memory which needs to define attributes and properties

What is claimed is:

1. A virtual element selection device for use in electronically growing virtual life in an electronic game device, comprising:

indication means for providing a visual indication as a user input to said game device;

numerating means for numerating the visual indication into a number data signal;

a neural network for classifying the number data signal into one of a plurality of class numbers which corresponds to the number data signal, said neural network having an output layer including an N×M matrix of units, where N and M are integers, and one of said class numbers corresponding to each unit, a reference table for storing a plurality of elements concerned with growth of the virtual life, said reference table having an N×M matrix of cells corresponding to said N×M matrix of units in said output layer of said neural network, each cell corresponding to a species of said element;

an image memory for storing images of the respective elements; and judging means coupled to the neural network, the reference table, and the image memory for judging whether or not the; element of the virtual life is modified into a modified element with reference to the class number;

means for modifying at least one element of the virtual life; and display means for displaying to the user the user input and the image of the modified element when the element of the virtual life is modified in playing said game device;

wherein the indication means provides the visual indication drawn by the user on the display means in the form of an input map; and said numerating means being for numerating the input map into the numerical data signal.

2. A virtual element selection device as claimed in claim 1, wherein the neural network is structured by an recurrent neural network.

3. A virtual element selection device as claimed in claim 2, wherein the recurrent neural network has a plurality of output points which correspond to the respective class numbers.

4. A method of selecting, in an electronic game device, an element of virtual life which grows up in the electronic game device, comprising the steps of:

providing a visual indication in the form of visual information as a user input to said game device, said user drawing said visual indication on a display device, converting the visual information into a numerical data signal corresponding to the visual information by using a neural network;

classifying the numerical data signal into a class number;

judging in response to the class number whether or not the element of the virtual life is to be modified;

preparing an element reference table which stores a plurality of elements;

having access to the element reference table on judging that the element of the virtual life is changed at the judging step, to extract a modified element from the element reference table;

modifying the virtual life to contain the extracted modified element; and visually displaying the modified element on said display device in playing said game device.

5. A method as claimed in claim 4, wherein the neural network is structured by an recurrent neural network;

said class number being made to correspond to an ignition point of the recurrent neural network.

6. A recording medium storing a game program which is for use in growing virtual life in an electronic device to change each element of the virtual life and which defines the steps of:

providing a visual indication in the form of visual information as a user input to said game program, said user drawing said visual input on a display device;

converting the visual information by the use of a neural network into a numerical data signal corresponding to the visual information;

classifying the numerical data signal into a class number;

judging in response to the class number whether or not the element of the virtual life is to be modified;

preparing an element reference table which stores a plurality of elements;

having access to the element reference table on judging that the element of the virtual life is changed at the judging step, to extract a modified element from the element reference table;

modifying the virtual life to contain the extracted modified element; and visually displaying the modified element on said display device in playing said game device.

7. A video game device for use in playing a predetermined game by the use of a display device under manipulation of a user, comprising a central processing unit for executing a program which defines the predetermined game;

a neural network operating as an interactive interface between the user and the central processing unit; and a display device wherein, an input to said neural network is provided by a user drawn visual indication on said display device.

8. A video game as claimed in claim 7, further comprising:

indication as a user input means for providing a visual indication to the neural network to be converted into element information by the neural network; and an image memory for storing an image corresponding to the element information to be displayed on the display device under control of the central processing unit.

* * * * *